July 30, 1935.  J. L. APPLEGATE  2,009,540

FISHHOOK

Filed Oct. 6, 1934

Inventor

J. L. Applegate

By *Clarence A. O'Brien*
Attorney

Patented July 30, 1935

2,009,540

UNITED STATES PATENT OFFICE 2,009,540

FISHHOOK

James L. Applegate, Woodriver, Ill.

Application October 6, 1934, Serial No. 747,242

4 Claims. (Cl. 43—40)

The present invention relates to new and useful improvements in fish hooks and has for its primary object to provide, in a manner as hereinafter set forth, a device of this character embodying novel means for securing thereon live bait, particularly minnows.

Another important object of the invention is to provide a device of the character described which comprises novel means for securing the hooks in position while at the same time permitting said hooks to be changed when desired.

Other objects of the invention are to provide a fishing appliance of the character described which will be comparatively simple in construction, strong, durable, highly attractive to the fish, compact and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1:
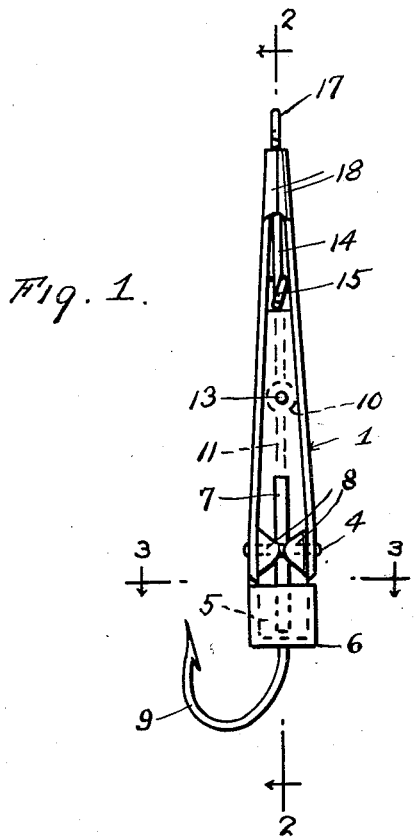
Figure 1 is an elevational view of the invention.
Figure 2:
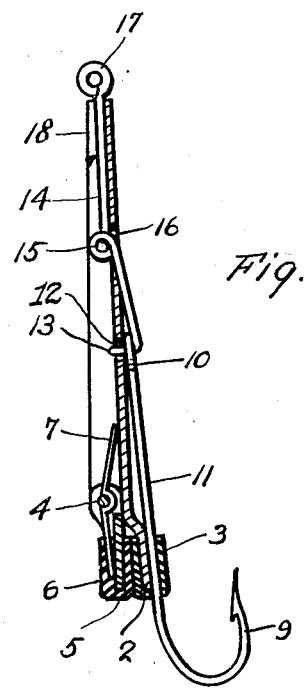
Figure 2 is a longitudinal sectional view, taken substantially on the line 2—2 of Figure 1.
Figure 3:
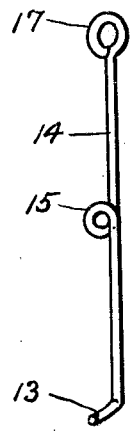
Figure 3 is a view in transverse section, taken substantially on the line 3—3 of Figure 1.
Figure 4:
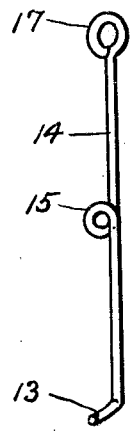
Figure 4 is a detail view in perspective of the resilient hook securing latch.

Referring now to the drawing in detail, it will be seen that the embodiment of the invention which has been illustrated comprises a substantially channel-shaped supporting bar 1 of suitable material, preferably metal, which tapers toward its upper or forward end, as illustrated to advantage in Figures 1 and 2 of the drawing. Formed integrally with the rear end of the substantially channel-shaped bar 1 is an offset stationary jaw 2 which is provided with a rubber covering 3. Extending between the side flanges of the substantially channel-shaped supporting bar 1 is a pin 4 upon which a pivoted jaw 5 is journaled for coaction with the stationary jaw 2 for securing a minnow or other live bait in position. The pivoted jaw 5 is provided with a rubber covering 6 and said jaw 5 is yieldingly urged toward closed position by a flat spring 7 which, as best seen in Figure 2 of the drawing, is provided with a substantially U-shaped intermediate portion which receives the pin 4. The spring 7 is engaged with the jaw 5 beneath the rubber 6. At its pivoted end, the jaw 5 has formed thereon inturned ears 8 (see Figure 1) with which a thumb may be engaged for swinging said jaw 5 to open position against the tension of the spring 7.

The reference numeral 9 designates a fish hook of conventional construction which is removably mounted on the bar 1, the shank of said hook passing through the rubber covering 3 of the stationary jaw 2. The eye 10 on the free end of the shank 11 of the hook 9 is brought into registry with an opening 12 in the bar 1. The opening 12 is for the reception of a hook 13 on one end of a resilient wire latch 14 which is secured in the bar 1, said hook 13 passing through the eye 10. At an intermediate point, and within the substantially channel-shaped bar 1, the latch 14 is formed to provide a coil 15, said latch then passing through an opening 16 which is provided therefor in said bar 1 for engagement with the fish hook 9. At its other end, the latch 14 terminates in an eye 17 for connection with the line (not shown). The reduced forward end portion of the channel bar 1 is pressed inwardly in a manner to tightly engage the latch 14, as at 18, for securing said latch in position in the bar.

In use, the jaws 2 and 5 grip a fin of the minnow therebetween, the rubber coverings 3 and 6 of said jaws assuring a good grip without injuring said minnow. This constitutes an important feature of the invention. It will thus be seen that the minnow is secured in position immediately adjacent the hook 9. As hereinbefore stated, the pivoted jaw 5 may be swung to open position to permit the insertion of the bait by engaging a thumb with the ears 8 on the pivoted end of said jaw 5.

It is believed that the many advantages of a device constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed. For example, any suitable material other than rubber, such as fabric, may be used to cover the jaws 2 and 5 to provide gripping surfaces.

What is claimed is:—

1. A device of the class described comprising a bar, coacting jaws on the bar, rubber coverings on the jaws, a fish hook mounted on the bar, the shank of said hook passing through one of the rubber coverings, and a latch mounted on the bar and engaged with the hook for securing said hook in position, said jaws being adapted to secure a bait in position adjacent the hook.

2. A device of the class described comprising a substantially channel-shaped bar having openings therein, a hook mounted on the bar and including an eye aligned with one of the openings, a resilient latch mounted in the bar, said latch including an intermediate coil, said latch extending through the other opening and terminating, at one end, in a hook engaged in the eye and in said one opening for securing the first-named hook in position on the bar, an eye on the other end of the latch for connection with a line, and means for securing the latch in the bar.

3. A device of the class described comprising a substantially channel-shaped bar, an integral, longitudinally offset stationary jaw on one end of the bar, a pin mounted transversely in the bar adjacent said one end, a pivoted jaw journaled on the pin and cooperable with the stationary jaw, resilient means yieldingly urging the pivoted jaw toward closed position, said jaws including resilient coverings, a fish hook mounted on the bar, the shank of said hook passing through the covering of the stationary jaw, and means for securing the hook in position on the bar.

4. A device of the class described comprising a substantially channel-shaped bar, an integral, longitudinally offset stationary jaw on one end of the bar, a pin mounted transversely in the bar adjacent said end, a pivoted bar journaled on the pin and cooperable with the stationary jaw, resilient means yieldingly urging the pivoted jaw toward closed position, said jaws including resilient coverings, a fish hook mounted on the bar, the shank of said hook passing through the covering of the stationary jaw, and means for securing the hook in position on the bar, the bar having openings therein, the fish hook including an eye on one end aligned with one of said openings, the last-named means comprising a resilient latch mounted in the bar, said latch including an intermediate coil, said latch extending through the other opening and terminating, at one end, in a hook engaged in the eye of the hook and in said one opening, and an eye on the other end of the latch for connection with a line.

JAMES L. APPLEGATE.